June 20, 1967  D. VRSALJKO  3,326,045
WEATHER CONDITION INDICATING DEVICE
Filed Jan. 21, 1966  5 Sheets-Sheet 1
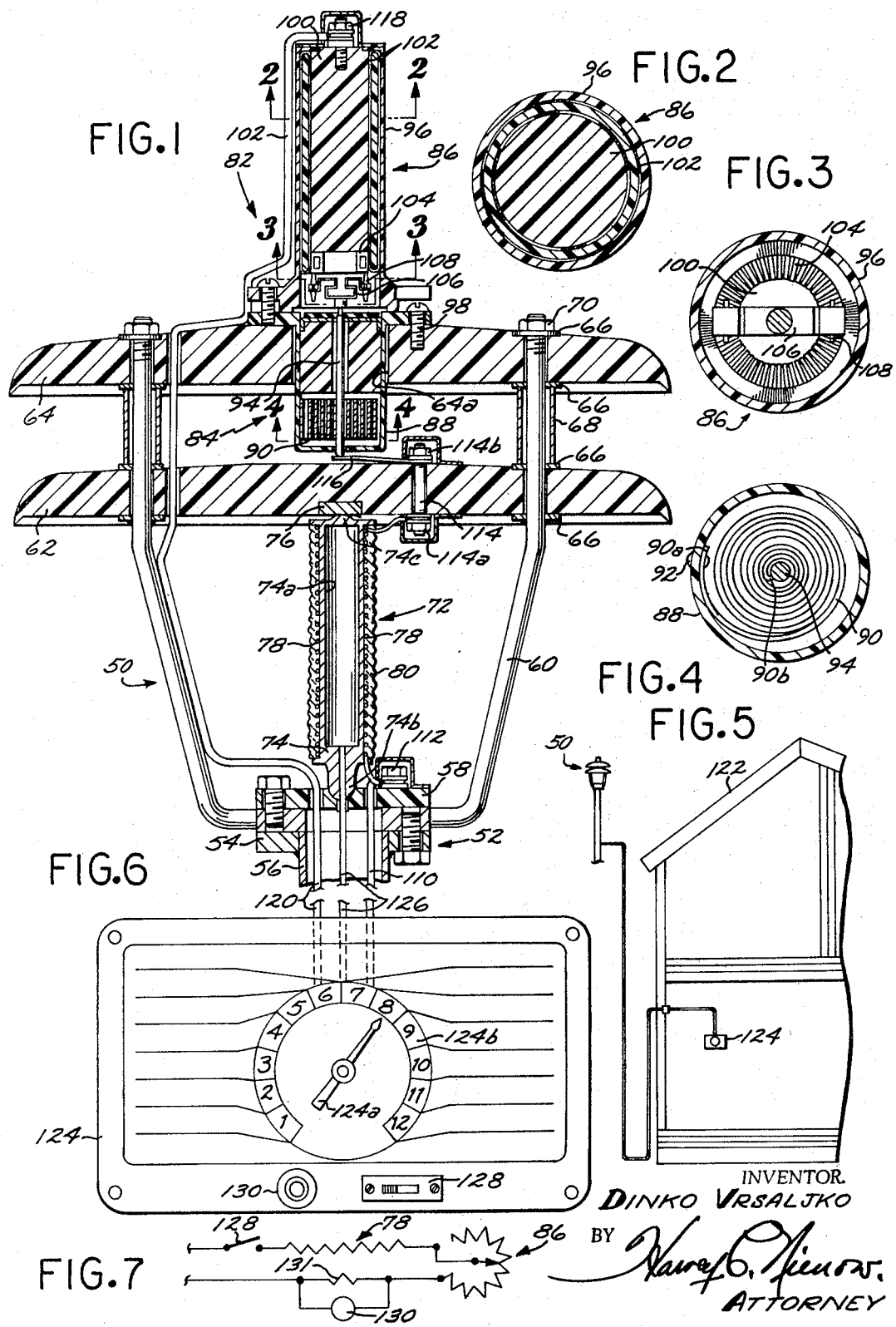
INVENTOR.
DINKO VRSALJKO
BY
ATTORNEY June 20, 1967 D. VRSALJKO 3,326,045
WEATHER CONDITION INDICATING DEVICE
Filed Jan. 21, 1966 5 Sheets-Sheet 2
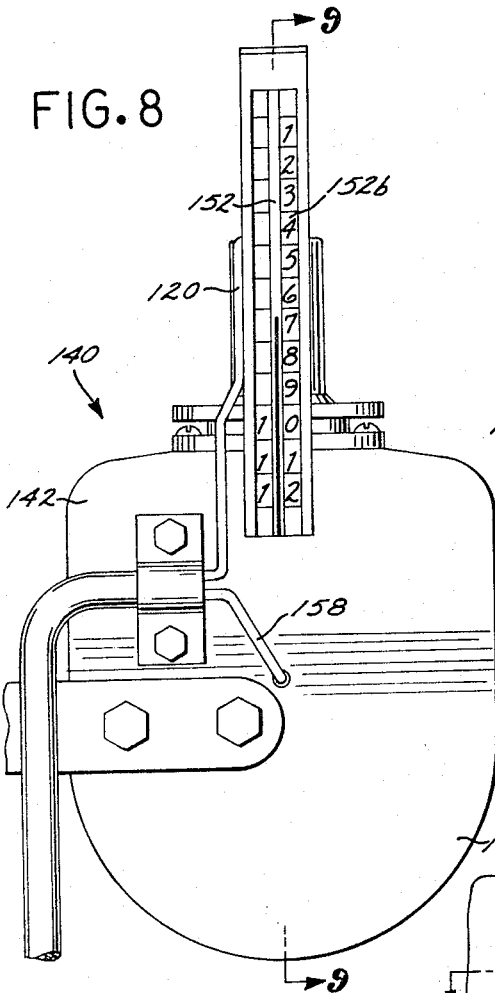
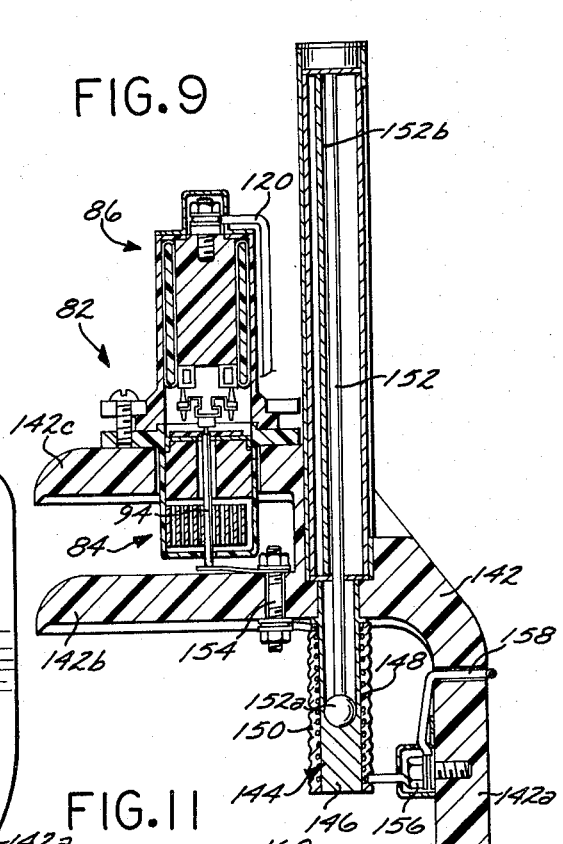
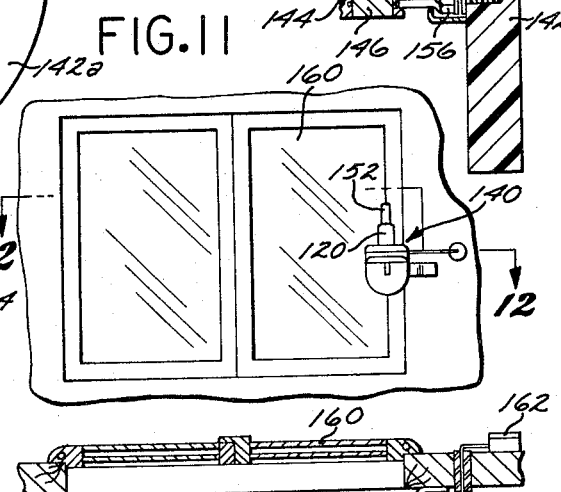
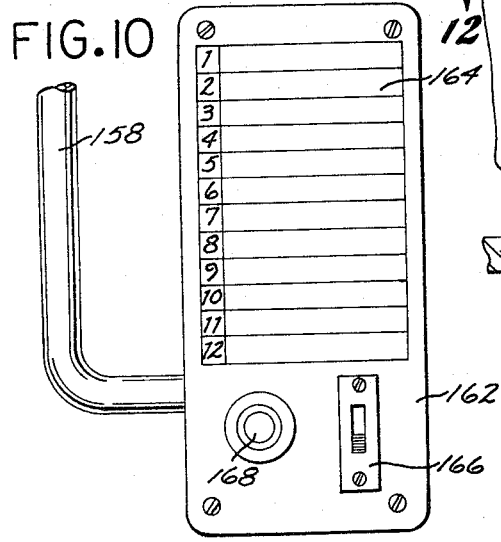
INVENTOR.
DINKO VRSALJKO
BY
ATTORNEY June 20, 1967 D. VRSALJKO 3,326,045
WEATHER CONDITION INDICATING DEVICE
Filed Jan. 21, 1966 5 Sheets-Sheet 3
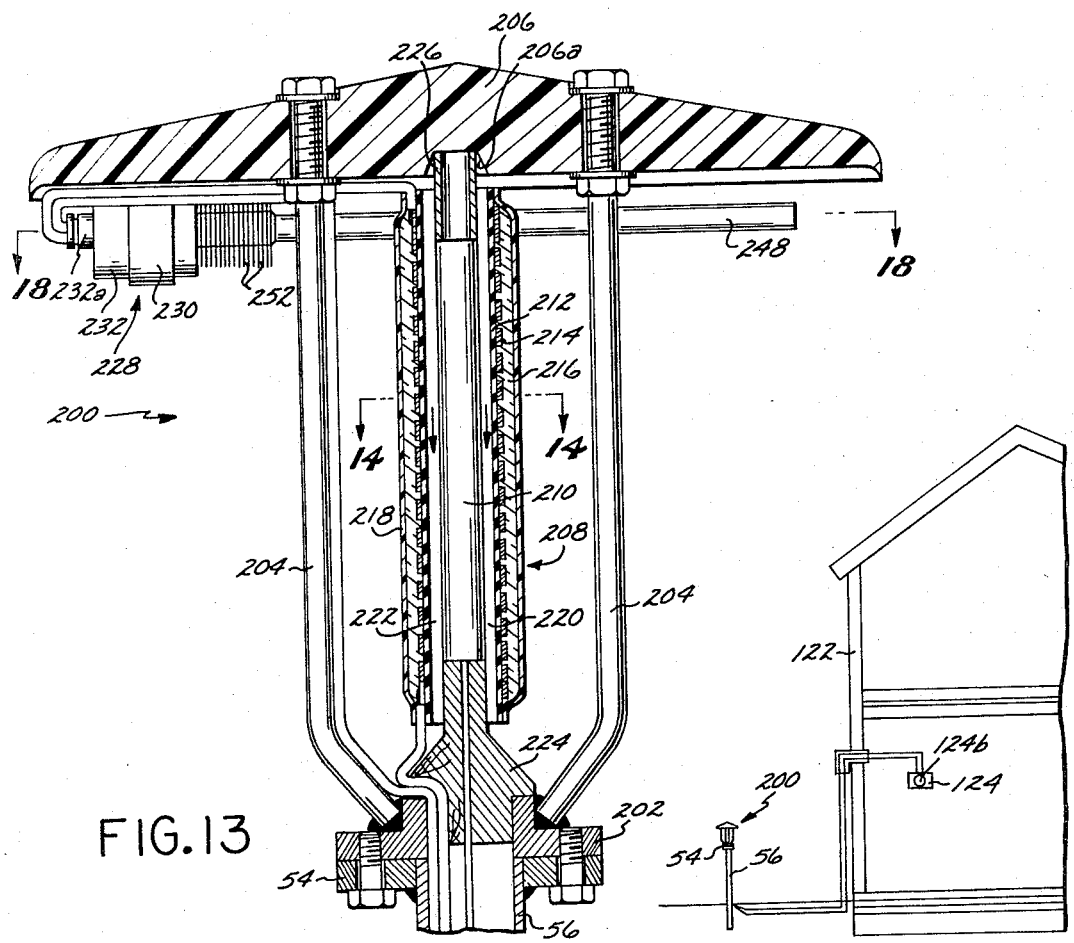
FIG.13
FIG.22
FIG.21
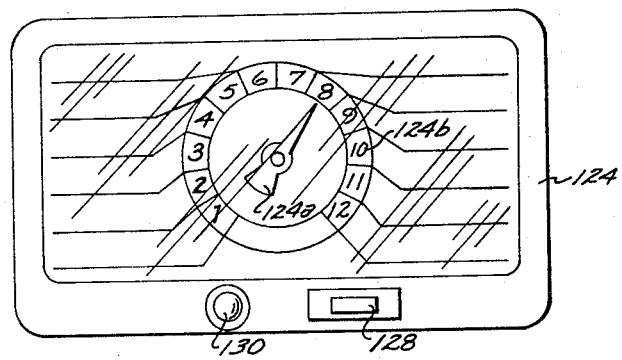
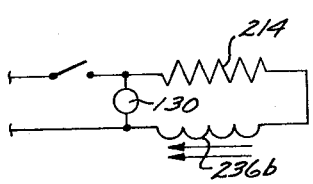
FIG.23
INVENTOR.
DINKO VRSALJKO
BY
Harvey O'Bienow
ATTORNEY

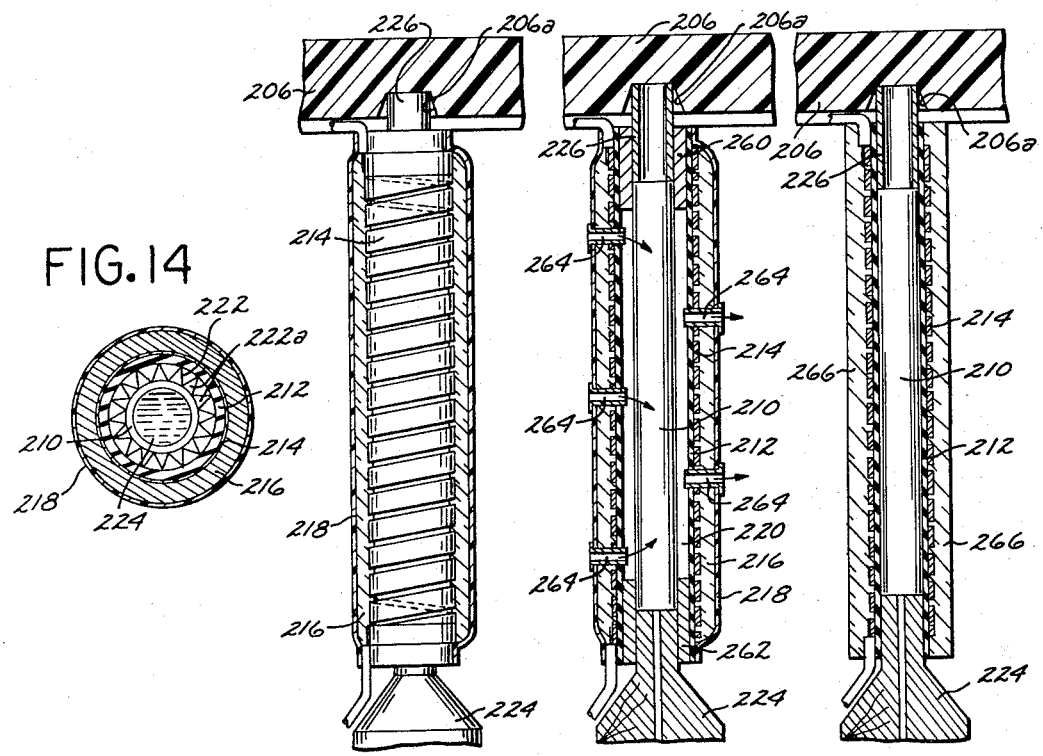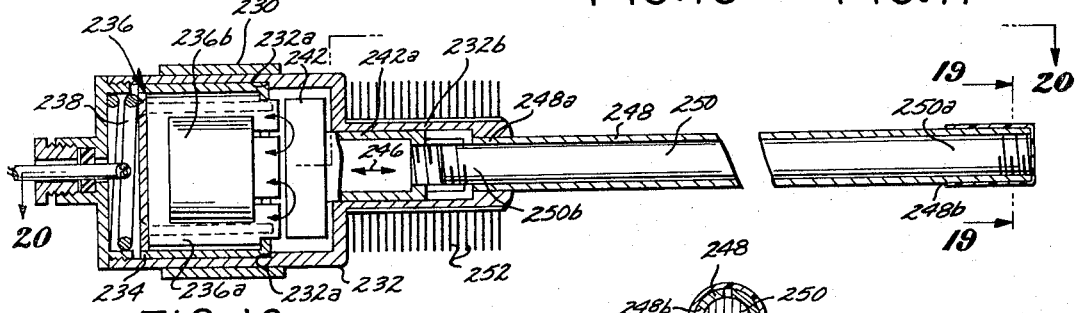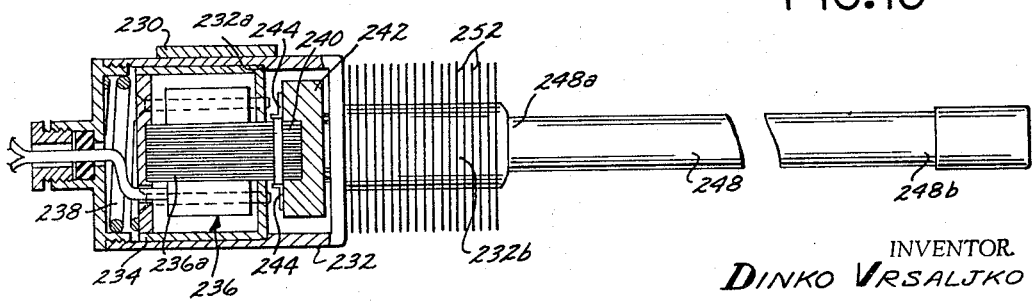

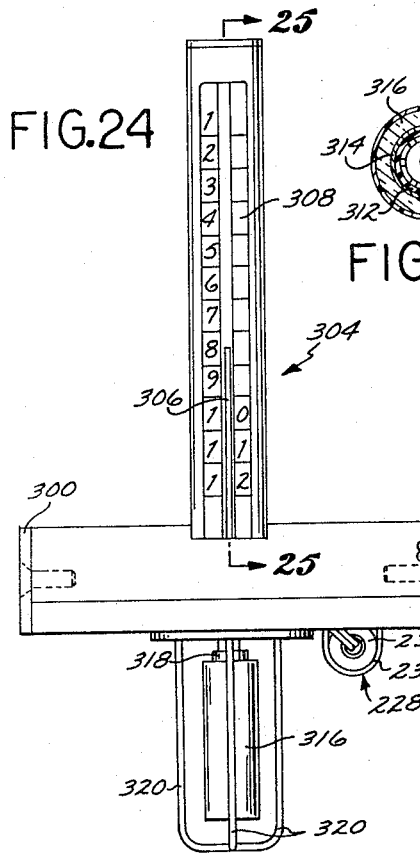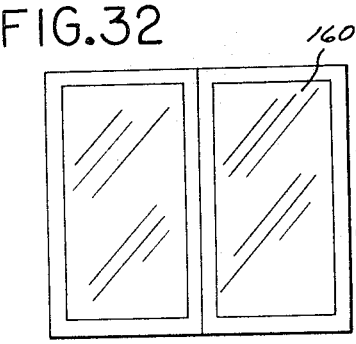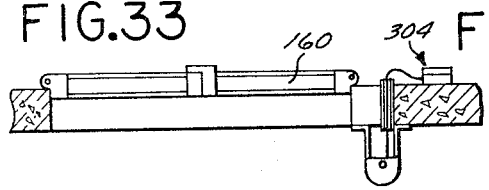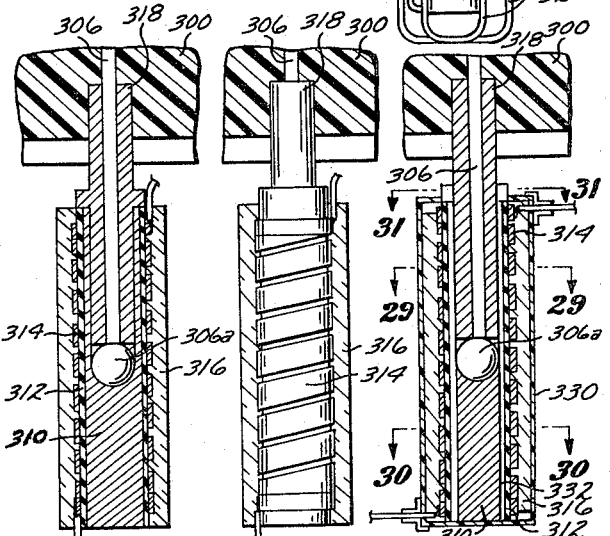

United States Patent Office 3,326,045
Patented June 20, 1967

3,326,045
WEATHER CONDITION INDICATING DEVICE
Dinko Vrsaljko, Trumbucac 11, Split,
Croatia, Yugoslavia
Filed Jan. 21, 1966, Ser. No. 523,842
16 Claims. (Cl. 73—339)

This application is a continuation-in-part of my copending application Ser. No. 268,835, filed Mar. 28, 1963, and now abandoned.

The present invention relates generally to indicating devices, and more particularly to devices for indicating the proper wearing apparel for a person under prevailing weather conditions.

The physical comfort of a person is dependent upon many variable characteristics of the prevailing weather conditions. That is, a person's physical comfort is not related solely to the prevailing temperature, but rather is also dependent upon the wind, barometric pressure, fog, rain, snow and the like which may be existing at a given moment. To be more specific, although only temperature is usually used to determine the amount and type of wearing apparel to be worn by a person, the rate of evaporation of moisture and heat from the person's body is of equal importance. For instance, the amount of moisture in the ambient atmosphere as well as the temperature of the air and the amount of fog, snow, rain and the like determine the rate at which body heat is dissipated. Also such conditions determine the rate at which moisture evaporates from the body and, as is well known, the evaporation of moisture from the body has a direct bearing on the comfort and general feeling of the person.

As mentioned above, most persons, because of the lack of better devices, rely almost exclusively on thermometers and the like to determine the amount and types of clothes to be worn. If the temperature of the prevailing weather is high, usually light weight and light colored clothing is worn. However, under certain conditions it may be more appropriate to wear heavier clothing in spite of the fact that the temperature is relatively high.

Conversely, although low temperatures usually dictate the use of heavier and darker clothing, this is not always desirable. In view of the foregoing, it has been determined that means for defining and indicating the existing comfort factor of prevailing weather conditions would be desirable in order to inform persons as to the precise amount and type of clothing to be worn. Such comfort factor takes into account not only the temperature but also other prevailing weather conditions.

It is an object of the present invention to provide an indicating device for providing an indication of the composite of various existing weather characteristics.

Another object of the present invention is to provide an indicating device as characterized above having indicating means located within the usual home or other dwelling for indicating the amount and type of clothing to be worn outside thereof.

Another object of the present invention is to provide a device as characterized above having means for simulating certain physical characteristics of a person such that the usual body heat, changes in external temperature and the effect of wind thereon are analyzed and given proper consideration in indicating the proper amount and type of clothing to be worn.

A still further object of the present invention is to provide an indicating device as characterized above having protective members such that a portion thereof can be located where the weather conditions are prevailing.

Another object of the present invention is to provide a device as characterized above having a chamber with an expansible and contractible fluid fill, which chamber is heated in accordance with changes in ambient temperature, and wherein means is provided for permitting the prevailing ambient air to pass over such chamber.

A still further object of the present invention is to provide a device as characterized above which can be placed in any desired location near a home or other dwelling and which has a pleasing appearance.

An even further object of the present invention is to provide a device as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a longitudinal view through a first embodiment of the present invention;

FIGURE 2 is a transverse sectional view, taken substantially along line 2—2 of FIGURE 1;

FIGURE 3 is a transverse sectional view, taken substantially along line 3—3 of FIGURE 1;

FIGURE 4 is a transverse sectional view, taken substantially along line 4—4 of FIGURE 1;

FIGURE 5 is a fragmentary sectional view of a dwelling provided with indicating means according to FIGURE 1;

FIGURE 6 is a front elevational view of indicating means for use with the embodiment shown in FIGURE 1;

FIGURE 7 is a schematic drawing of an electrical circuit for use in such first embodiment;

FIGURE 8 is an elevational view of a second embodiment of the present invention;

FIGURE 9 is a longitudinal sectional view of said second embodiment, taken substantially along line 9—9 of FIGURE 8;

FIGURE 10 is a front elevational view of indicating means for use with the embodiment of FIGURES 8 and 9;

FIGURE 11 is a fragmentary elevational view of the second embodiment located adjacent the windows of a building;

FIGURE 12 is a sectional view of the windows and second embodiment in FIGURE 11;

FIGURE 13 is a longitudinal sectional view through a third embodiment of the present invention;

FIGURE 14 is a transverse sectional view, taken substantially along line 14—14 of FIGURE 13;

FIGURE 15 is a sectional view of the heater unit for the third embodiment shown in FIGURE 13;

FIGURE 16 is a first modification of the heater unit for use in the third embodiment;

FIGURE 17 is a sectional view of a second modification of the heater unit for said third embodiment;

FIGURE 18 is a transverse sectional view through the variable inductance unit of the third embodiment;

FIGURE 19 is a transverse sectional view, taken substantially along line 19—19 of FIGURE 18;

FIGURE 20 is a fragmentary sectional view through the variable inductance unit, taken substantially along line 20—20 of FIGURE 18;

FIGURE 21 is a front elevational view of indicating means for use with the third embodiment;

FIGURE 22 is an elevational view of a dwelling showing the third embodiment in operating position;

FIGURE 23 is a schematic view of the electrical circuitry for the third embodiment;

FIGURE 24 is an elevational view of a fourth embodiment of the present invention;

FIGURE 25 is a fragmentary sectional view of said fourth embodiment, taken substantially along line 25—25 of FIGURE 24;

FIGURE 26 is a fragmentary longitudinal sectional view through the heater unit for said fourth embodiment;

FIGURE 27 is another fragmentary sectional view of the heater unit for the fourth embodiment;

FIGURE 28 is a longitudinal sectional view of a modification of the heater unit for said fourth embodiment;

FIGURE 29 is a transverse sectional view, taken substantially along line 29—29 of FIGURE 28;

FIGURE 30 is a transverse sectional view, taken substantially along line 30—30 of FIGURE 28;

FIGURE 31 is a transverse sectional view, taken substantially along line 31—31 of FIGURE 28;

FIGURE 32 is an elevational view of the fourth embodiment positioned adjacent a set of windows of a building; and FIGURE 33 is a plan view of the showing in FIGURE 32.

Like reference characters indicate corresponding parts throughout the several views of the drawings.

Referring to FIGURE 1 of the drawings, there is shown therein a first embodiment 50 for illustration of the present invention. Such embodiment comprises a fitting 52 in the form of a flange member 54 attached to the upper end of a mounting post 56 as by welding, brazing, soldering or the like. Mounted on such flange member is a bracket 58 adapted to receive the lower end portions of a plurality of support members 60. Substantially any desired number of such support members 60 may be employed, although it has been found preferable to have four of them in the emodiment shown in FIGURE 1. The bracket 58 is formed with horizontally disposed openings for receiving the lower end portions of such support members.

Mounted in spaced relation on the upper portion of such support members 60 is a pair of protective members 62 and 64. Such protective members are provided with appropriate through openings for receiving the support members 60, and washers 66, spacers 68 and fastening nuts 70 are employed to maintain the protective members 62 and 64 in such spaced relation. The upper end portion of each of the support members 60 is formed with fastening threads for receiving one of the fastening nuts 70.

Interposed between bracket 58 and protective member 62 is a device 72 for simulating a person's properly clothed body. Such device comprises body member 74 having a hollow interior or chamber 74a. The lower end portion 74b of such body member is extended to fit within an appropriate depression or cutout formed in bracket 58. In like fashion, the upper end portion 74c of body 74 is formed with a protuberance which rests against resilient pad 76, the latter of which is positioned within an appropriate recess formed in the under surface of protective member 62. It will be readily apparent to those persons skilled in the art that such arrangement affords mounting of simulating device 72 such that abrupt forces applied to the embodiment 50 will not cause damage to such device.

Simulating device 72 further comprises a heating coil 78 wound about the body 74 substantially the entire length of the chamber 74a therein. Suitable insulation, as shown at 80, is provided about the coil 78, such insulation being sufficiently porous to permit free flow of air therethrough.

Mounted on the uppermost protective member 64 is a temperature responsive circuit controlling device 82. Such device 82 comprises a temperature responsive element 84 operatively positioned between the protective members 62 and 64, and a circuit controlling device 86 mounted on the member 64.

Temperature responsive element 84 comprises a housing 88 positioned within a substantially centrally located opening 64a in member 64. Housing 88 is mounted in depending position between the spaced protective members to protect the same from various weather conditions.

Within housing 88 is a spiral temperature responsive element 90 which may take any one of various different forms. As shown in FIGURE 4 of the drawings, such element may comprise a spirally arranged tube or hollow member having a temperature responsive fluid fill, or a spirally wound bimetallic element, such that the shape of the element is changed in accordance with variations in temperature being sensed.

One end 90a of element 90 is fastened to housing 88 by any appropriate means such as a rivet 92. The other or inner end 90b of said element is attached to a rotatable shaft 94 for operation of the current varying device 86.

Substantially any desired form or style of current varying means may be employed, although it is preferable to use what is commonly referred to as a rheostat. The embodiment 86 shown in the drawings comprises a housing or enclosure 96 having suitable mounting flanges and the like whereby it can be firmly secured to the protective member 64 by suitably mounting screws 98. Within such enclosure is a core 100, and about the periphery of such core there is provided a plurality of windings or convolutions 102 of wire of appropriate size and weight. Although such windings may extend in substantially any desired direction, the embodiment 50 shown in FIGURE 1 has such windings extending longitudinally of the core 100.

Suitable stationary contacts 104 are individually connected to the various windings or convolutions of wire, and all of such contacts are arranged in a circular pattern as shown most clearly in FIGURE 3 of the drawings.

A rotatable movable contactor 106 is attached to the upper end of shaft 94 and is provided with suitable roller type contact elements 108 for engagement with the various stationary contacts 104. Such rollers may be attached to the upper end of shaft 94 by a resilient current carrying member such that the rollers or wheels are continually biased into engagement with the stationary contacts 104.

The embodiment 50 is to be connected to a source of electrical power (not shown) as will be readily apparent to those persons skilled in the art. To accomplish this, a lead wire 110 extends upwardly through the mounting pipe 56 and is connected to a terminal 112 carried by bracket 58. The lower end of heating coil 78 is also attached to the terminal 112. The upper end of such coil is attached to the lower terminal end 114a of a connector 114 which extends through the lower protective member 62. The upper terminal end 114b of connector 114 is connected in circuit with the rotatable shaft 94 by means of a spring conductor 116. The upper end of such shaft 94, as above explained, is connected to the various windings 102 of the rheostat 86 through the flexible conductor 106 and the roller type contact elements 108.

Mounted on enclosure 96 is a terminal 118, to which one end of the rheostat coil is connected to complete the circuit through such coil. A lead wire 120 has one end connected to such terminal 118, and extends through suitable openings formed in protective members 64 and 62 to be positioned within mounting post 56.

As shown in FIGURE 5 of the drawings, the embodiment 50 is mounted externally of a home, dwelling or other enclosure 122. The lead wires 110 and 120 may continue down the mounting post 56 to be positioned underground and ultimately extend into the interior of dwelling 122. At that location such lead wires are connected to any appropriate source of power, as will hereinafter become readily apparent to those persons skilled in the art.

Mounted within enclosure 122 is indicating means 124. This device may take substantially any desired form but must be responsive to changes in fluid pressure to cause an indicator 124 to assume a different position with respect to a scale 124b, as shown most clearly in FIGURE 6 of the drawings.

Chamber 74a of simulating device 72 is connected to indicating means 124 by a conduit 126. This conduit merely transmits pressure variations from within the chamber 74a, as caused by temperature variations by coil 78, to the mechanism within indicating means 124 for moving the indicator 124a.

The scale 124b of indicating means 124 is provided with suitable indicia corresponding to various weather conditions for indicating comfortable clothing to be worn at such time. That is, the actual indicia on scale 124b should be determined empirically and may comprise substantially any letters or numerals indicating a condition of comfort under particular weather conditions. Perhaps the most significance of the indicia of scale 124b is the relative values of the various positions of indicator 124a.

As shown in FIGURE 7 of the drawings, rheostat 86 is connected in series circuit relation with the heating coil 78 of simulating means 72. To eliminate the need for having the embodiment 50 continually connected to the source of electrical power, suitable switch means 128 may be employed as shown. An indicator light 130 may also be used to provide visual indication that the subject device is being used and a current limiting resistor 131 being employed in parallel with such light 130.

It may be desirable to provide such switch 128 and indicator light 130 on the indicating means 124, as shown in FIGURE 6 of the drawings. In this event, the lead wires 110 and 120 may be brought into the housing or enclosure for the indicating means 124 so as to be connected in circuit with the switch and light mounted therein.

The above-explained first embodiment functions generally as follows.

The device 72 simulates a person's clothed body with respect to the normal body heat and temperature, and with respect to the effect thereon of variations in ambient temperature, snow, rain, fog, barometric pressure and other weather conditions. Thus, when a person desires to dress for maximum comfort in the outside weather conditions, it is a simple matter for him to actuate switch 128 to its "ON" position. This causes rheostat 86 and winding 78 to be energized in series circuit relation. At the same time the indicator light 130 is energized to afford visual indication that the series circuit has been completed.

The amount of current supplied to coil 78 of simulating means 72 is dependent upon the condition of rheostat 86. The latter, in turn, is controlled by temperature sensing means 84 between the two protective members 62 and 64. Thus, as the ambient temperature decreases, the shaft 94 is rotated such as to cause the contactor wheels 108 to be repositioned to provide additional current for coil 78. In this matter the device 72 is caused to simulate a person's body when properly clothed for the then prevailing weather conditions. It will be noted, however, that the temperature sensing means 84 is positioned between the protective members thus eliminating the effects of snow, rain and the like which might accumulate on such a device if it were to be exposed directly to the weather conditions.

The fluid fill of chamber 74a and conduit 126 is such that it expands and contracts upon increase and decrease in temperature. Accordingly, as the temperature varies within chamber 74a, the position of the indicator 124a is changed accordingly, with respect to the scale 124b. Thus, by having scale 124b calibrated in accordance with a person's physical comfort or the amount of clothes to be worn to provide physical comfort, an indication is thus afforded as to what type of clothing should be worn.

It should be noted that the temperature within chamber 74a is always equal to the mean temperature of the outside layers of a person where properly dressed or clothed for the then prevailing weather conditions. The difference between the constant skin temperature of a person and said mean temperature of his clothing may be inscribed on the scale 124b to provide the comfort factor.

When the desired information has been obtained, the apparatus can be actuated to its "OFF" position by appropriate operation of switch 128.

A second embodiment 140 of the present invention is shown in FIGURES 8–12, inclusive. This embodiment comprises a frame 142 having a mounting portion 142a and a pair of spaced protective elements 142b and 142c. A simulating element 144 is provided beneath the lowermost protective portion 142b and comprises a plug 146 about which a heating coil 148 is wound. Suitable insulation means 150 is wrapped about the heating coil 148 as shown in FIGURE 9 of the drawings.

Plug 146 is provided with a longitudinal opening at its upper end to receive the bulb or lower end 152a of a mercury temperature responsive element 152. As shown in FIGURES 8 and 9 of the drawings, a suitable scale 152b is provided adjacent the temperature responsive element 152, there being indicia on said scale corresponding to the indicia on scale 124a as above explained with respect to the indicating means shown in FIGURE 6.

Mounted on the uppermost protective element 142c of frame 142 is the temperature responsive current varying device 82 of embodiment 50 as above explained. Such device comprises the rheostat 86 mounted on the element 142c, and the temperature responsive means 84 positioned between the protective elements 142b and 142c.

The heating coil 148 is connected in series circuit relation with the rheostat by means of a terminal connector 154, the upper end of such coil being attached to the lower terminal end of the connector, while the upper terminal end of the connector is connected in circuit with the shaft 94 of the temperature responsive means 84. The lower end of coil 148 is connected to a terminal 156 to enable a lead wire 158 to be connected to a suitable source of power. The lead wire 120 from the top of the rheostat is also connected to such source.

As shown in FIGURES 11 and 12 of the drawings, the embodiment 140 may be placed adjacent a window 160 to be positioned exteriorly of the dwelling. Thus, the scale 152b can be viewed through the window.

In order to permit the embodiment 140 to be energized and de-energized at will, and to afford an explanation of the various indicia on scale 152, a control panel 162 is positioned within the dwelling. Such control panel comprises a chart 164 having the various indicia from the scale 152b arranged thereon together with the type of clothing to be worn. Also, to enable the embodiment 140 to be energized and de-energized, a switch 166 is provided on control panel 162 together with an indicator light 168. Switch 166, light 168, simulating means 144 and rheostat 86 are connected in circuit with the source of power as above explained with respect to the first embodiment.

When it is desired to determine the amount of clothing to be worn under prevailing weather conditions, it is merely necessary to actuate switch 166 to its "ON" position. This completes the energizing circuit for rheostat 86 and simulating means 144 from the source of electrical power. At the same time, the lamp 168 is energized to afford indication of the fact that the indicating means is energized.

As above explained, with respect to the first embodiment, simulating means 144 is energized in accordance with the position of rheostat 86. The position of the latter, of course, is determined by the ambient temperature as sensed by temperature means 84. Thus, if the ambient temperature decreases the temperature of simulating means 144 decreases but in such a way that the temperature of outside layers of clothes of the properly dressed person is simulated, as that temperature responds to temperature and other wind, barometric pressure, etc. variations. In this manner the temperature of a person's body is simulated as it responds to temperature variations.

Due to the porous nature of insulation 150 more or less heat will be dissipated from coil 148 to the atmosphere in accordance with prevailing weather conditions. That is, if heat would be readily dissipated from a person's body, then it will be readily dissipated from the coil 148 through the insulation 150. Conversely, if the weather conditions are such that a person's body would retain the heat, then the heat afforded by energization of coil 148 will also be retained causing the thermometer 152 in increase the level of merucry therewithin.

It is then a simple matter for the person to note the position of the level of mercury on the scale 152b and to determine the proper clothing to be worn as indicated on chart 164.

FIGURE 13 of the drawings shows a third embodiment 200 of the present invention. This embodiment also is mounted on a hollow mounting post 56 by means of a flange member 54 and a bracket 202. Mounted in such bracket are suitable support members 204 which carry a protective member 206 at their upper end portions. It will be noted that this embodiment comprises only a single protective member for reasons which will hereinafter become more apparent.

Positioner between bracket 202 and protective member 206 is a simulating device 208 which is similar to the simulating device 72 of the above explained first embodiment 50.

Device 208 comprises an inner tubular member 210 having a hollow interior which constitutes an expansion and contraction chamber for fluid fill. Positioned about such tubular member 210 is an insulating sleeve 212 about which the heating coil 214 is wound. Suitable insulation means 216 is positioner about the coil 214 and a suitable nonporous sleeve or enclosure 218 may be employed about the entire assembly.

As shown in FIGURE 13, it is desirable to centrally locate tubular member 210 with respect to insulating sleeve 212 so as to provide a substantially equal air space 220 about the tubular member 210. As will be readily apparent to those persons skilled in the art, this feature is desirable for the accuracy of the apparatus in responding to heat afforded by coil 214.

Although various different devices may be employed for centering tubular member 210 as indicated, the device employed in embodiment 200 and shown most clearly in FIGURE 14 is an elongated tubular member 222 which is formed with longitudinal flutes or ribs 222a. Such member may be formed of a section of pipe. The internal diameter of the pipe will then retain the tubular member 210 while the outer extremities of the ribs 222a engage the internal diameter of the tubular insulating member 212. Thus, there is provided substantially constant air space about tubular member 210.

A plug 224 is provided between the lower end of simulating device 208 and bracket 202. Such plug may be formed of any appropriate material such as hardwood or the like. The upper end of simulating device 208 is held in fixed position by a plug 226, the upper end portion of which is mounted within a recess 206a of protective member 206.

Embodiment 200 is particularly characterized by the use of a variable inductance device 228. Such device is shown in detail in FIGURES 18 and 20, and is fixed to the underside of protective member 206 by any appropriate means such as strap or bracket 230.

Device 228 operates on the principal that the alternating current flow in a coil or winding varies in accordance with the inductance of said winding.

Device 228 comprises a housing 232 wherein is positioned an enclosure 234 having an electromagnetic unit 236 therewithin.

Housing 232 is formed with a pair of shoulders 232a, and a compression spring 238 is provided between enclosure 234 and the end wall of housing 232 to bias said enclosure into engagement with said shoulders.

Electromagnetic unit 236 comprises a relatively stationary core 236a which may take substantially any desired form, such as a plurality of E-shaped laminations, Such unit also includes a winding 236b mounted on such core. In the event an E-shaped core 236a is employed, the winding 236b may be positioned about the intermediate leg thereof.

As shown most clearly in FIGURES 18 and 20, the legs of core 236a provide pole faces for cooperation with a relatively movable armature 240. Such armature is carried by and recessed within a movable member 242. Suitable guide means as shown at 244 may be employed, if desired.

Housing 232 is provided with a reduced end portion 232b having a central opening for slidably receiving a reduced portion 242a of movable member 242. Thus, as indicated at 246 movable member 242 and armature 240 thereon are movable within housing 232 relative to core member 236a of electromagnetic means 236.

A tubular member 248 has one end 248a anchored to housing 232. The other end 248b is fixed to one end 250a of an actuating rod 250. The opposite end 250b of said rod 250 is fixed to movable member 242.

By proper selection of the materials of which tubular member 248 and rod 250 are formed, it is possible to cause changes in temperature to effect movement of movable member 242 relative to core 236a. That is, by selecting materials of different coefficients of expansion for these members, any change in temperature will cause relative movement between the tubular member 248 and rod 250.

The aforedescribed movement causes armature 240 to be moved relative to core 236a of electromagnetic unit 236. Such change in relative position, effects a change in the inductance of winding 236b and corresponding change in the alternating current flow in such winding.

Winding 236b is connected in series circuit arrangement with heating coil 214 and indicator light 130 is connected in parallel with such series circuit as shown most clearly in FIGURE 23. Accordingly, any change in temperature sensed by tube 248 and rod 250 results in a change in current flow through heating coil 214.

Heat dissipating fins 252 are provided on the reduced portion 232b of housing 232 to effectively isolate the electromagnetic means 236 from the temperature sensing means afforded by tube 248 and rod 250. This insures the accuracy of the device 228 to variations in ambient temperature.

The compression spring 238 is operable to permit the entire electromagnetic unit 236 to move in the event movable member 242 is urged to an extreme position against the pole faces of core 236a. This prevents injury to the mechanism, and insures that the electromagnetic means 236 will be returned to its proper reference position, wherein the enclosure 234 is in engagement with shoulders 232a, upon return of the movable member 242 to spaced relation with the pole faces.

FIGURE 15 of the drawings is an elevational view of coil 214 of FIGURE 13, the insulation and nonporous enclosure being cut away.

FIGURE 16 shows a second embodiment of the simulating means 208. Here, the air passages 220 are closed at the top and bottom by spacers 260 and 262. This, of course, eliminates the need for the ribbed tubular spacer 222 as above described, the spacers 260 and 262 being used to retain the tubular member 210 in centrally located position with respect to heating coil 214.

To permit the ambient air to freely circulate about the tubular member 210, suitable passage means 264 are provided as shown in FIGURE 16. Thus, air is permitted to enter the simulating unit 208, to circulate about the tubular member 210 and thereafter to return to the ambient atmosphere.

The heater structure shown in FIGURE 17 is without any specific air passage means through the simulating device. Rather, the nonporous outer shell 218 is not employed in this heater modification and only relatively porous insulation means 266 separates the heating coil 214 from the surrounding atmosphere.

FIGURES 21 and 22 are the same as FIGURES 6 and 5, respectively, referring to the use of indicating means 124 in conjunction with embodiment 200 of FIGURES 13–20, inclusive. FIGURE 23 shows an indicator light 130 connected in parallel with a series circuit composed of heating coil 214 and winding 236b.

FIGURE 24 shows a fourth embodiment of the present invention. A bracket 300 is provided for attachment to the side of a dwelling and comprises a protective member 302. Also mounted on such bracket is a temperature indicator 304 in the form of a mercury thermometer 306. A scale 308 adjacent the mercury tube is provided as above described with respect to the embodiment of FIGURE 8.

As shown in FIGURE 26, the bulb 306a of mercury thermometer 306 is positioned within an end recess of a heat conductive member 310. About such member 310 there is provided an insulating sleeve 312, which may be formed of porcelain or the like, and a heating coil 314. Insulation means 316 which is relatively porous is provided about the heating coil.

Suitable lead wires afford electrical current to coil 314 as above explained with respect to the other embodiments of the present invention, and a mounting plug 318 which may be formed of hardwood or other appropriate material positions the simulating means in depending relation to bracket 300.

A protective enclosure 320 is provided about the simulating means, and may take the form of a wire cage which does not restrict the flow of air.

FIGURE 27 of the drawings shows the heating coil 314 with a portion of the insulation 316 removed.

A variable inductance device 228 as above described is mounted on the undersisde of protective member 302. such variable inductance and the heating coil 314 are connected in series circuit relation with a source of power (not shown), whereby the amount of current afforded to coil 314 varies in accordance with ambient temperature as above described. The prevailing comfort condition or the proper clothing to be worn by an individual can then be read from the thermometer and scale 308 as above described with respect to the second embodiment of FIGURE 8.

FIGURES 32 and 33 show the fourth embodiment positioned adjacent windows 160 of a dwelling, whereby the outside weather conditions can be sensed directly and indication thereof afforded to a person within the dwelling.

FIGURES 28, 29, 30 and 31 show a modified form of simulating device for use in the fourth embodiment. This structure comprises an outer nonporous shell 330 about the entire unit thus preventing the free circulation of ambient air through the insulation 316. Accordingly, there is provided air passages 332 which permit air to flow up and down through the simulating unit, thereby causing dissipation of heat from coil 314 to the surrounding atmosphere.

FIGURES 32 and 33 indicate one possible application of the embodiment 304 shown in FIGURES 24–31, inclusive, such embodiment being positioned adjacent a window 160 of a dwelling.

It is thus seen that the present invention provides a device for closely approximating the various physical characteristics of a human being such that a comfort factor is afforded. The amount and type of clothing to be worn by an individual can then be quickly and easily ascertained.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A device for indicating comfortable amount and type of wearing apparel to be worn in accordance with prevailing weather conditions comprising in combination, means simulating a person exposed to prevailing weather conditions formed with a chamber having a temperature responsive fill and comprising electrically energizable heating means about said chamber, said simulating means further including means permitting dissipation of heat from said chamber in accordance with ambient weather conditions, means including a source of electric power for energizing said heating means in accordance with ambient temperature conditions, and indicating means operatively connected to said temperature responsive fill to indicate the composite effect on asid fill of ambient temperature and ambient weather conditions which effect heat dissipation and retention.

2. A device for indicating comfortable amount and type of wearing apparel to be worn in accordance with prevailing weather conditions according to claim 1, wherein said indicating means has an indicator movable relative to a scale which is provided with indicia indicating amount and type of apparel to be worn.

3. A device for indicating comfortable amount and type of wearing apparel to be worn in accordance with prevailing weather conditions according to claim 1, wherein said means for energizing said heating means comprises a temperature responsive current varying circuit device connected in circuit with said source and said heating means to energize the latter from said source according to the ambient temperature.

4. A device for indicating comfortable amount and type of wearing apparel to be worn in accordance with prevailing weather conditions according to claim 3, wherein said circuit device is a rheostat having a rotatable contactor for varying the amount of current applied to said heating coil from said source and further includes a temperature responsive spiral element associated with said contactor to rotate the same in response to changes in ambient temperature.

5. A device for indicating comfortable amount and type of wearing apparel to be worn in accordance with prevailing weather conditions according to claim 4, wherein said spiral element comprises a pair of juxtaposed members formed of materials having different coefficients of expansion in response to temperature variations.

6. A device for indicating comfortable amount and type of wearing apparel to be worn in accordance with prevailing weather conditions according to claim 4, wherein said spiral element is formed with an elongated cavity having an expansible and contractible fluid fill.

7. A device for indicating comfortable amount and type of wearing apparel to be worn in accordance with prevailing weather conditions according to claim 1, wherein interconnecting means is provided between said chamber and said indicating means to permit said indicating means to be remotely located wth respect to said ambient weather conditions.

8. A device for indicating comfortable amount and type of wearing apparel to be worn in accordance with prevailing weather conditions comprising in combination, means simulating a person exposed to prevailing weather conditions formed with a chamber having a temperature responsive fill and comprising electrically energizable heating means about said chamber, said simulating means further including means permitting dissipation of heat from said chamber in accordance with prevailing weather conditions, a first protective member disposed superjacent said simulating means to prevent accumulation thereon of snow and the like, means including a source of electric power for energizing said heating means, a second protective member disposed above said first and spaced therefrom, control means in circuit with said source and said heating means to effect energization of the latter in accordance with ambient temperatures, said control means comprising temperature responsive means disposed between said first and second protective members to prevent accumulation thereon of snow and the like, and indicating means operatively connected to said temperature responsive fill to indicate the composite effect on said fill of ambient temperature and other weather conditions.

9. A device for indicating comfortable amount and type of wearing apparel to be worn in accordance with prevailing weather conditions according to claim 8, wherein said protective members are of substantially identical construction and said temperature responsive means comprises a spiral control member within a housing positioned between said protective members.

10. A device for indicating comfortable amount and type of wearing apparel to be worn in accordance with prevailing weather conditions according to claim 9, wherein said means for energizing said heating means comprises a variable inductance device in circuit with a heating coil and an alternating current source of electric power, said inductance being caused to vary in accordance with variations in ambient temperature.

11. A device for indicating comfortable amount and type of wearing apparel to be worn in accordance with prevailing weather conditions according to claim 9, wherein said means for energizing said heating means comprises a rheostat having a rotatable contactor operated by said spiral control member.

12. A device for indicating comfortable amount and type of wearing apparel to be worn in accordance with prevailing weather conditions according to claim 11, wherein said spiral control member comprises a pair of juxtaposed elements having different coefficients of expansion in response to temperature variations, one end of said spiral control member being fixed to said housing and the other end having connection with said rotatable contactor.

13. A device for indicating comfortable amount and type of wearing apparel to be worn in accordance with prevailing weather conditions according to claim 11, wherein said spiral control member comprises a spiral tube having a temperature responsive fill, one end of said tube being fixed to said housing and the other end having connection with said rotatable contactor.

14. A device for indicating comfortable amount and type of wearing apparel to be worn in accordance with prevailing ambient weather conditions comprising in combination, means simulating a person exposed to ambient weather conditions comprising a tubular member affording a chamber therewithin, a temperature responsive fill within said chamber, an electrically energizable heating coil about said tubular member, means affording at least one passageway between said tubular member and said coil for passage of air therethrough to dissipate heat from said chamber in accordance with ambient weather conditions, means including a source of electric power for energizing said coil in accordance with ambient temperature conditions, and indicating means operatively connected to said temperture responsive fill to indicate the composite effect on said fill of ambient temperature and ambient weather conditions.

15. A device for indicating comfortable amount and type of wearing apparel to be worn in accordance with prevailing ambient weather conditions according to claim 14 wherein the opposite ends of said tubular member are sealed and said indicating means is a pressure responsive device for indicating variations in the pressure of said temperature responsive fill within said chamber.

16. A device for indicating comfortable amount and type of wearing apparel to be worn in accordance with prevailing ambient weather conditions according to claim 14, wherein said indicating means is remotely located, and a conduit is provided between said chamber and said indicating means to cause the latter to indicate pressure variations of said temperature responsive fill.

References Cited
UNITED STATES PATENTS

| | | | |
|---|---|---|---|
| 1,724,520 | 8/1929 | Schlaich | 73—368.6 X |
| 1,997,559 | 4/1935 | Hajek | 236—91 |
| 2,052,764 | 9/1936 | Harrison. | |
| 2,261,582 | 11/1941 | Haines | 236—68 |
| 2,423,781 | 7/1947 | Koontz | 236—68 |
| 2,584,989 | 2/1952 | Dember. | |
| 2,615,085 | 10/1952 | Smulski. | |
| 2,969,917 | 1/1961 | Nason | 236—91 |
| 2,998,720 | 9/1961 | Williams et al. | 73—342 X |

LOUIS R. PRINCE, *Primary Examiner.*

D. M. YASICH, *Assistant Examiner.*